Jan. 19, 1937.  E. H. GALFORD  2,068,128
COMBINATION ANGLE INDICATOR AND TRY SQUARE
Filed Aug. 23, 1934  2 Sheets-Sheet 1

Inventor
Everett Harson Galford
By Miller & Miller
Attorneys

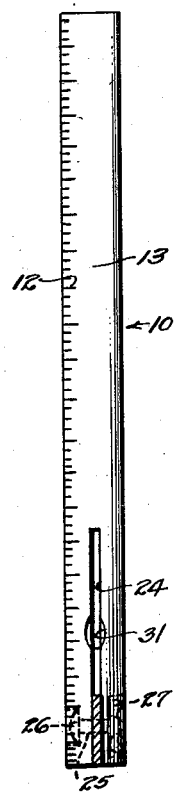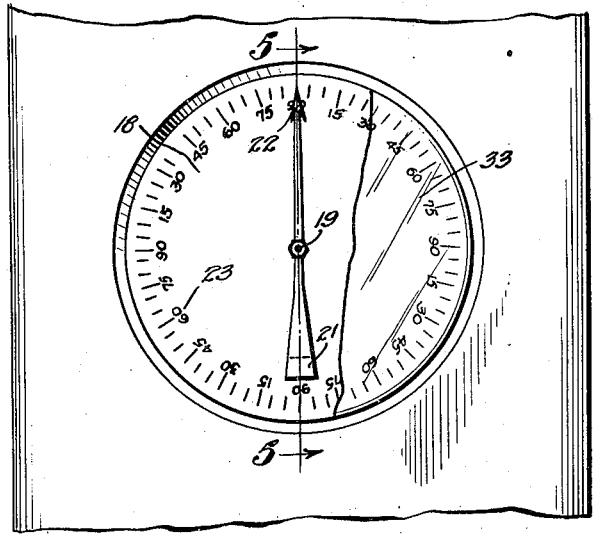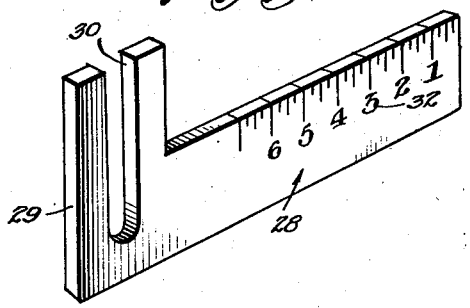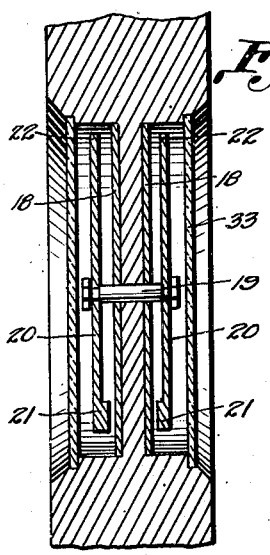

Patented Jan. 19, 1937

2,068,128

UNITED STATES PATENT OFFICE 2,068,128

COMBINATION ANGLE INDICATOR
AND TRY SQUARE

Everett Harson Galford, Covington, Va.

Application August 23, 1934 Serial No. 741,137

1 Claim. (Cl. 33—89)

This invention relates to a combination angle indicator and try square and has for an object to provide an improved level especially intended for use of carpenters, builders and the like, which level is provided with means for checking the level or angular position thereof.

A further object of this invention is to provide a combination of an angle indicator and try square.

Still a further object of this invention is to provide a combination level and try square which can also be used as an angle measuring means for any desired angle.

Still a further object of this invention is to provide a level which will also serve as an inclinometer.

Figure 1:
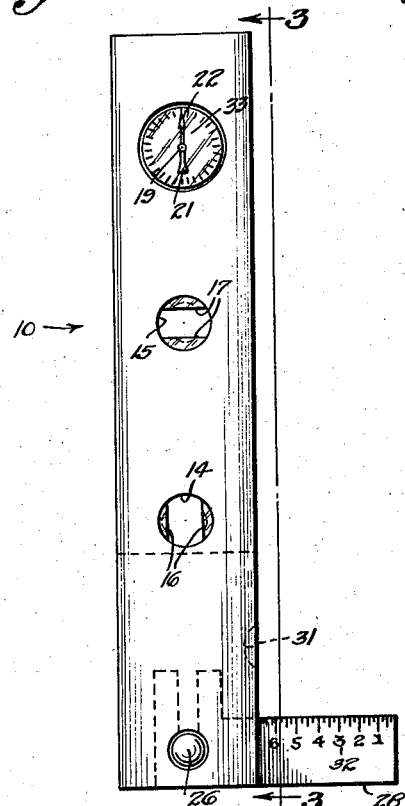
Figure 2:
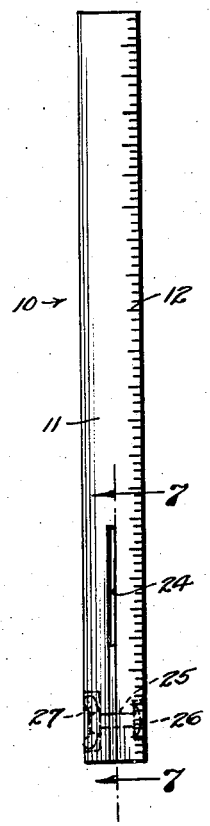
Figure 7:
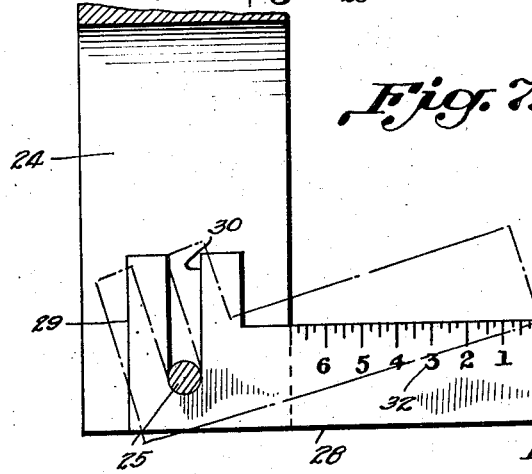

With the foregoing and other objects in view, as will hereinafter become apparent, this invention comprises the constructions, combinations, and arrangements of parts, hereinafter set forth, disclosed and shown on the accompanying drawings. In these drawings, Figure 1 is a side elevation of the invention, Figure 2 is a front view of the same, Figure 3 is a sectional view taken on the line 3—3 of Figure 1, Figure 4 is an enlarged front elevation of one of the degree dials, Figure 5 is a sectional view taken on the line 5—5 of Figure 4, Figure 6 is a perspective view of the bottom square, and Figure 7 is a sectional view taken on the line 7—7 of Figure 2.

There is shown at 10 the level block on one face 11 of which a series of measuring indicating marks 12 are placed so that the level may also serve as a handy rule. As shown in Figure 3, the measuring marks 12 are also repeated along the opposite base 13 for convenience.

The level block 10 is provided with a pair of cylindrical openings 14 and 15, each of these openings being provided with spirit levels. The opening 14 is provided with a pair of oppositely placed spirit levels 16 for use when the level is being used to determine a true level or a horizontal position.

The spirit levels 17 visible through the cylindrical opening 15 are so placed that the level is useful for determining a true vertical or plumb position of the object against which the level may be placed. By using a pair of oppositely placed spirit levels in each opening the advantage is gained that the true horizontal or true vertical position can be more definitely ascertained; when the level is out of true it is more easily visible due to the displacement of the spirit bubbles toward opposite sides. When the spirit bubbles are in coincidence with each other which is easily visible to the eye, then it is known that the level is in a true horizontal or vertical position.

In order that the level may also be used as an inclinometer so as to show any angle other than vertical or horizontal, it is provided at one end on the opposite base thereof with a pair of dial faces 18 over which is extended by means of a pivoting axle 19, indicating needles 20 which are weighted at one end as at 21 so as to cause the needles 20 to hang with their pointer ends 22 always in an upright position. Each dial 18 is provided with degree angle markings from zero to ninety degrees for each quarter.

The needle 20 acts as a plumb, the weight 21 causing it to rotate about the pivoting axle 19 and keep the pointer end 22 upright. When it is desired to use the level as an inclinometer the level is placed against the object whose inclination it is desired to measure, and the pointer 22 will read on the marking 23 the angle of the object. When the object is at a 90° angle or a 0° horizontal position then this fact will also be doubly checked by means of the spirit level 16 or 17.

At its other end the level is provided with a slot 24 and transversely through this slot 24 extends a bolt 25 whose head 26 is countersunk on one side of the level and whose wing nut 27 is countersunk on the other side of the level. The slot 24 is of a sufficient length to receive therein a try square 28, the try square 28 having one of its arms 29 bifurcated by a slot 30 of a suitable diameter to pass on opposite sides of the bolt 25 within the slot 24. The arm 29 is of less length than the width of the level 10 and as a result thereof the entire try square 28 can be countersunk within the slot 24 when not in use so that it will be out of the way when it is not desired, yet be convenient and accessible for use at any time when desired, a pair of countersunk finger depressions 31 being provided to allow the try square 28 to be grasped within the slot 24 and easily withdrawn therefrom after the wing nut 27 has been loosened to relieve the try square of the pressure thereof, for when the try square is within slot 24, it is held securely in position by tightening the wing nut 27 and the bolt 25.

As will be observed, the try square 28 is provided with a series of measure markings 32 so that it likewise may be used for measuring purposes when desired. When desired the try square 28 may be entirely removed and used as an independent try square, or by means of the bolt 25 it may be used in combination with the level 10 as a large try square, as shown in full line in Figure 7, the slot 30 and the arm 29 being of such a depth that the lower edge of this try square 28 will coincide with the lower edge of the level 10. By making use of the try square 28, the bolt 25 and wing nut 27 and the dial 18 with its pointer 22, a mitrometer or angle measuring device is provided for measuring any desired angle.

In order to use it as a mitrometer or angle measuring means the level is first used to determine a true level surface, then if an angle of say 37° is desired, the lower edge of the try square 28 is placed against the true level surface and the level 10 is pivoted about the bolt 25 until the pointer 22 hangs at the marking of 37°. The wing nut 27 is then tightened thereby holding the long arm of the try square 28 at an angle of 37° to the body of the level 10. In a similar way, the try square 28 may be said to indicate any desired angle relative to the body of the level 10 and used for measuring angles in that way.

In order to protect the needle 20 from being disturbed in its operation by the presence of dirt or other foreign objects, each dial face 18 and indicating needle 20 is covered with a transparent window 33 countersunk below the surface of the level 10 so as not to interfere with the operation thereof.

The novel features and the operation of this device will be apparent from the foregoing description. While the device has been shown and the structure described in detail, it is obvious that this is not to be considered limited to the exact form disclosed and that changes may be made therein within the scope of what is claimed without departing from the spirit of the invention.

Having thus set forth and disclosed the nature of this invention, what is claimed is:

A combination angle indicator and try square including a level block, an angle indicating dial on the face of said level block, an indicating needle pivotally suspended centrally on said dial, one end of said needle being in pointer form, a weight integrally attached to the other end of said needle to cause said needle to act as a plumb, a slot formed in said level block at the opposite end thereof from the dial, a bolt extending transversely through said slot and countersunk below the surface of said level block, a wing nut on said bolt countersunk beneath the opposite surface of said level block, a try square, one end of said try square being characterized by a bifurcated arm at right angles thereto, said try square being adapted to be removably inserted in said slot in said level block with said bifurcated arm extending about said screw bolt, said try square being adapted to pivot to any desired angle relative to said level block about said screw bolt, said wing nut and bolt cooperating with said try square to hold said try square at any desired angle relative to said level block as measured by said indicating dial and plumb indicator needle, the edge of said level block and the edge of said try square each being graduated.

EVERETT HARSON GALFORD.